United States Patent [19]

Hallock

[11] 4,004,483
[45] Jan. 25, 1977

[54] FASTENER FOR ATTACHMENT TO METALLIC STRUCTURES

[76] Inventor: Robert L. Hallock, 7136 NE. 8th Drive, Boca Raton, Fla. 33432

[22] Filed: Jan. 12, 1976

[21] Appl. No.: 648,212

[52] U.S. Cl. .................................. 85/10 E; 85/30; 151/41.73
[51] Int. Cl.² .................... F16B 15/00; F16B 39/00
[58] Field of Search .................. 85/10 E, 10 R, 30; 151/41.73

[56] References Cited

UNITED STATES PATENTS

| 1,946,065 | 2/1934 | Dodge | 151/41.73 X |
| 2,400,878 | 5/1946 | Dunn | 85/10 E X |
| 3,521,520 | 7/1970 | Udert et al. | 85/30 |
| 3,909,913 | 10/1975 | Tildesley | 151/41.73 X |

FOREIGN PATENTS OR APPLICATIONS

| 1,099,241 | 3/1955 | France | 85/10 E |
| 960,851 | 3/1957 | Germany | 85/10 E |
| 14,570 | 4/1951 | Germany | 85/10 E |
| 732,203 | 6/1955 | United Kingdom | 85/10 E |
| 757,560 | 9/1956 | United Kingdom | 151/41.73 |

Primary Examiner—Ramon S. Britts
Attorney, Agent, or Firm—Arthur E. Dowell, III

[57] ABSTRACT

A fastener apparatus having an elongated body with a hardened substantially non-bendable penetrating portion at one end which can be driven to a predetermined depth in metallic structures by a fluid or electrically operated driver or by a manually operated hammer and which forms a mechanical lock with the metallic structure to resist twisting, bending and extraction therefrom.

3 Claims, 7 Drawing Figures

FASTENER FOR ATTACHMENT TO METALLIC STRUCTURES

BACKGROUND OF THE INVENTION

1. Field of the Invention

This invention relates generally to fasteners having a portion which is driven into a base member and relates particularly to a fastener having a hardened substantially non-bendable penetrating portion which can be driven a predetermined distance into a relatively dense base member by a driving member and which forms a mechanical lock with such base member.

2. Description of the Prior Art

In the past many fasteners including nails, screws, rivets, and the like have been provided in which the nails and wood screws normally were provided for use with a relatively soft base material such as wood, press board, plaster and the like, while machine screws and rivets have been provided for attachment to relatively dense hard base members such as steel and other metallic structures. Ordinarily when attaching a fastener to a relatively hard base such as metal, a hole is drilled and tapped for receiving the threads of a machine screw or other similar fastener or a hole is drilled entirely through the base material for receiving a rivet having a head at one end and the opposite end of the rivet is peened over after the rivet has been inserted within the hole.

Some efforts have been made to provide a fastener which could be driven into a hard metallic base member; however, it has been necessary in most cases to drive the fastener at a high velocity by means of an explosive charge or the like in order to cause the penetrating portion thereof to become embedded within the metallic structure. Not only have these fasteners been difficult to use, they have also been dangerous since a premature actuation of the explosive charge could cause serious injury to any one in the vicinity. A few fasteners have been provided with a penetrating point which could be driven into a metallic base, however, these fasteners usually require that a hole be formed in the metallic base through which the nail is driven.

Some examples of the prior art are U.S. Pat. Nos. 1,907,495 to Bronski; 2,954,717 to Henning et al; 3,555,957 to Hermle; as well as British Patent 732,203; French Patent 1,099,241; and German Patent 960,851.

SUMMARY OF THE INVENTION

The present invention is embodied in a fastener for attachment to metallic structures without the use of an explosive charge and in which the fastener includes a shank having a hardened penetrating portion at one end defined by a tip which is connected by a reduced neck to an enlargement to cause metal, into which the fastener is driven, to flow into the reduced portion adjacent to the neck and form a mechanical lock therewith. Such enlargement is connected to the end of the shank which defines a shoulder for limiting penetration into the metallic structure. Since the fastener may be driven by a manually operated hammer, as well as by a fluid or electrically operated driver, the dimensions and proportions of the penetrating end of the fastener are critical. The penetrating portion is of a hardness and configuration to penetrate hard dense material such as structural steel without deforming or breaking and causes portions of the steel material to flow into the area adjacent to the neck without shearing so that the penetrating portion of the fastener is secured to the base metal in a manner such that tilting along the longitudinal axis of the fastener is resisted and a substantial force is required to withdraw the same.

It is an object of the invention to provide a fastener for attachment to metallic structures in which the fastener has a hardened penetrating portion which is adapted to form a mechanical lock with a hard dense material such as steel or the like without breaking and in a manner to resist withdrawal.

DESCRIPTION OF THE PREFERRED EMBODIMENTS

Figure 1:
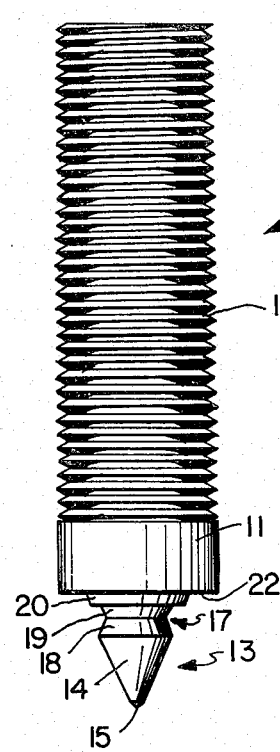
FIG. 1 is a side elevation illustrating one embodiment of the invention.

With continued reference to the drawing, a fastener 10 is provided having a generally cylindrical shank 11 which is constructed of any desired material such as heat treated steel alloy 4063. If desired the shank 11 may be provided with screw threads 12 for receiving and supporting a cooperating member (not shown); however, it is contemplated that the shank 11 may be of any desired configuration with or without the screw threads 12.

A penetrating portion 13 is provided at one end of the shank 11 and such penetrating portion includes a tip 14 having a penetrating point 15 at one end. The tip may be of generally conical configuration, as shown, or may be of tapered multi-sided configuration. In order to take maximum advantage of the force applied axially of the fastener, the tip 14 tapers upwardly and outwardly at an angle A which preferably is at an angle of 22½° from the longitudinal axis or at an included angle of approximately 45°. Normally in driving a fastener with a penetrating point having an included angle of 45° or less into a hard dense material, such as a metal base 16 of structural steel or the like, the penetrating end of the fastener has a tendency to break and in order to reduce the likelihood of breakage, the penetrating point 15 is disposed at an included angle greater than 45°. As illustrated, the penetrating point 15 has an included angle of approximately 90°.

Figure 2:
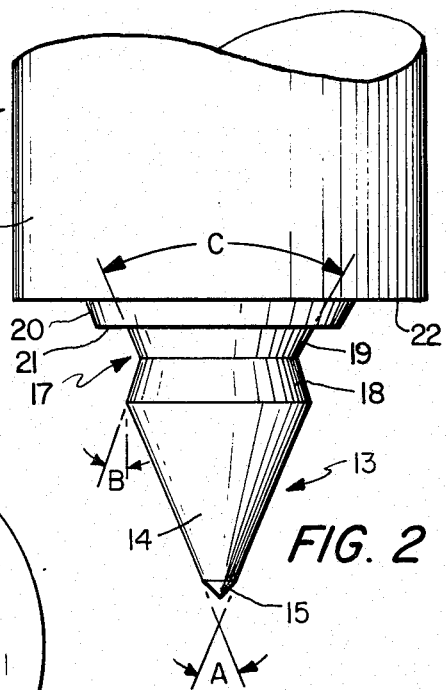
FIG. 2 is an enlarged side elevation of the penetrating portion of the fastener.
Figure 3:
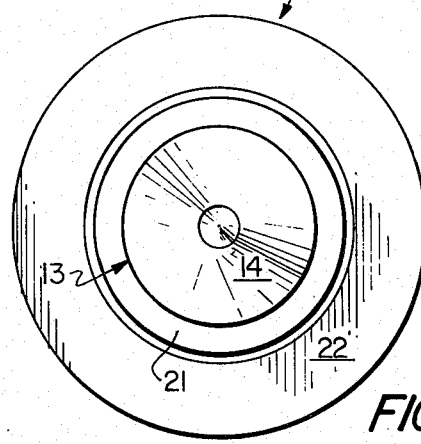
FIG. 3 is an end view thereof.

With particular reference to FIG. 2, the end of the tip 14 remote from the penetrating point 15 is connected to a shallow elongated neck 17 defining a annular groove having a first portion 18 which tapers upwardly and inwardly from the tip 14, and a second portion 19 which tapers upwardly and outwardly from the first portion to a position substantially in alignment with the large end of the tip 14. The first and second portions of the annular groove define a reduced area having a cross-sectional width substantially four to eight times as great as the depth. In order to achieve this, the first portion 18 tapers upwardly and inwardly at an angle B of approximately 15° from the longitudinal axis of the fastener or at an included angle of 30°, while the second portion tapers upwardly and outwardly at an angle C of approximately 22½° from the axis of the fastener or at an included angle of approximately 45°. The shallow annular groove is necessary in order to reduce breakage at the neck and to provide a space into which material from the metallic base may flow.

Figure 4:
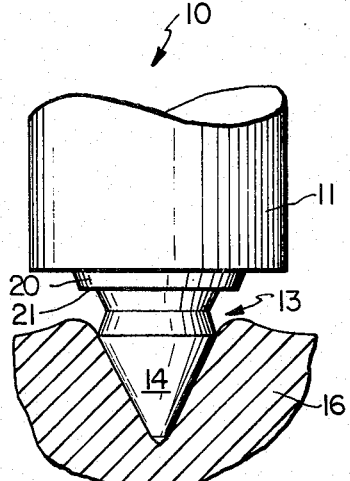
FIGS. 4, 5 and 6 are side elevations illustrating several steps in driving the fastener into a steel base member.
Figure 5:
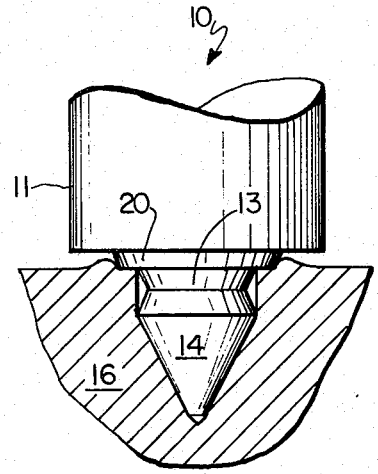

The neck 17 terminates in an enlargement 20 having a lower surface or first shoulder 21 extending outwardly beyond the tip 14 and such enlargement preferably has a volume which is greater than the volume of the annular groove but approximates such volume, as shown in FIG. 5. In this way the void is filled with a minimum of penetration of the enlargement 20. The enlargement 20 terminates in a second shoulder 22 which forms the end of the shank 11 and which is adapted to engage the metal base 16 to limit or stop further penetration of the penetrating portion 13 after the annular groove has been completely filled with material from the metallic structure. Further penetration will cause the material collected within the space adjacent to the neck to be sheared away from the metallic structure thereby breaking the mechanical lock. As illustrated, the enlargement 20 is of generally frusto-conical configuration; however, it is contemplated that such enlargement could be of cylindrical or multi-sided configuration. With reference to FIGS. 1–6, the enlargement 20 may have relatively smooth side wall surfaces, or with reference to FIG. 7, the enlargement may have a knurled side wall 23 which engages the base metal and resists rotation of the fastener.

Although the fastener 10 may be of any desired size, a specific example, which has been found satisfactory, includes a shank 11 that is formed of stock material having a diameter of 0.138 inch (3.505 mm) and an overall length of 0.625 inch (15.875 mm). If desired, the shank may have a 6-32 thread extending along its length. The penetrating portion 13 at the end of the shank 11 may have a length of approximately 0.105 inch (2.667 mm) and the tip 14 may have a maximum dimension of 0.075 inch (1.905 mm). Preferably, at least the penetrating portion 13 is heat treated to a hardness of Rockwell 53-55 to substantially eliminate breakage or deformation of such penetrating portion when the fastener is driven.

Figure 6:
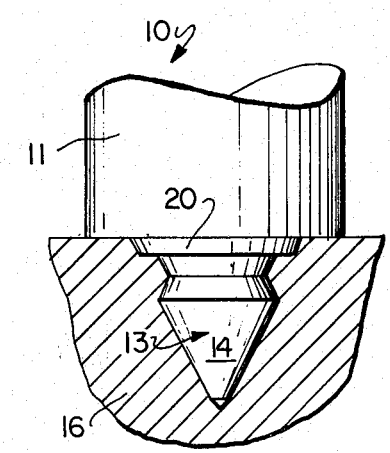

In the operation of the device, the fastener 10 may be located within a recess of a hammer having a magnetized head to hold the fastener in driving position with the penetrating portion extending outwardly of the hammer. When the fastener is to be driven into the base metal 16, a driving force is applied to the hammer so that the penetrating portion of the fastener penetrates the base metal, as illustrated in FIGS. 4–6. During the penetration, the tip 14 forces the dense base material outwardly and upwardly until the tip is entirely embedded, as illustrated in FIG. 4. Continued penetration of the fastener cuts a generally cylindrical hole in the base metal (FIG. 5) until the first shoulder 21 on the lower portion of the enlargement 20 engages the base metal and causes the material of the base metal to flow into the annular groove and form a mechanical lock therewith. During this movement the enlargement 20 is embedded in the base metal until the second shoulder 22 at the end of the shank 11 engages the metal and stops further penetration, as illustrated in FIG. 6. It is important that the shoulder 22 stops penetration since it is difficult to control the striking force applied by the hammer and if penetration is too deep, the portion of the base material which flows into the annular groove will be sheared from the remainder of the base metal with the result that the mechanical lock is destroyed and the fastener can be easily withdrawn.

With the proportions of the present fastener, any rocking motion of the shank is resisted, breakage of the penetrating portion 13 at the neck 17 or the penetrating point 15 during driving is substantially eliminated and a force of up to approximately 400 pounds is required to withdraw the fastener depending upon the strength of the base metal 16.

Figure 7:
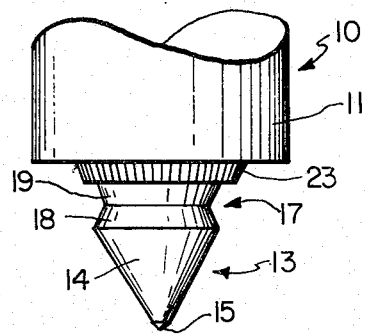
FIG. 7 is a side elevation of the penetrating portion of a modified form of the invention.

With the modification illustrated in FIG. 7, the knurled side wall surfaces 23 of the enlargement 20 additionally resist any tendency of the fastener to rotate when a nut or other threaded member is applied to the screw threads 12.

I claim:

1. A fastener having a penetrating portion for driving into metallic structures comprising a shank, a hardened penetrating portion at one end of said shank, said penetrating portion including a substantially frusto-conical tip having a penetrating point at one end and a predetermined diameter at the opposite end, a reduced neck formed at said opposite end of said tip defining an annular groove having a cross-sectional width substantially greater than the depth, the opposed ends of said neck being of substantially the same diameter, an enlargement connected to said neck and defining a first substantially radial shoulder extending outwardly therefrom for engaging the metallic structure and causing the metal thereof to flow into said annular groove and form a mechanical lock, said enlargement terminating in a second substantially radial shoulder of greater diameter than said first shoulder at said one end of said shank to stop penetration of said penetrating portion into the metallic structure, said enlargement being of a volume at least as great as and approximating the volume of said annular groove to cause the flowing metal to fill said annular groove as said second shoulder stops penetration of said penetrating portion, whereby the penetrating portion of said fastener may be driven into the metallic structure and said first shoulder causes the metal of the metallic structure to flow into the area adjacent to said neck and form a mechanical lock therewith and said second shoulder stops penetration of said penetrating portion into the metallic structure.

2. The structure of claim 1 in which said frustoconical tip has an included angle of 45°.

3. The structure of claim 1 in which said annular groove includes a first upwardly and inwardly tapered portion connected to a second upwardly and outwardly tapered portion.

* * * * *